United States Patent [19]

Kleine et al.

[11] E Re. 30,072

[45] Reissued Aug. 14, 1979

[54] SAFETY CLAMP

[75] Inventors: Richard A. Kleine, Peoria, Ill.; Warren J. Byers, Winsted, Minn.; Charles A. Wright, Columbus, Wis.

[73] Assignee: Unarco Industries, Inc., Chicago, Ill.

[21] Appl. No.: 834,153

[22] Filed: Sep. 16, 1977

Related U.S. Patent Documents

Reissue of:

[64] Patent No.: 3,908,791
Issued: Sep. 30, 1975
Appl. No.: 412,169
Filed: Nov. 2, 1973

[51] Int. Cl.[2] ..... E06C 5/36

[52] U.S. Cl. ..... 182/8; 24/134 R; 182/5; 188/65.2

[58] Field of Search ..... 182/3-9, 182/190, 191, 192, 193; 24/134 R; 188/65.1, 65.2

[56] References Cited

U.S. PATENT DOCUMENTS

| | | | |
|---|---|---|---|
| 1,955,473 | 4/1934 | Raymer | 182/9 |
| 2,753,100 | 6/1956 | Montgomery | 182/9 |
| 3,006,431 | 10/1961 | Meyer | 182/5 |
| 3,179,994 | 4/1965 | Meyer | 182/3 |
| 3,250,515 | 5/1966 | Hudnall | 182/5 |
| 3,317,971 | 5/1967 | Meyer | 182/5 |

FOREIGN PATENT DOCUMENTS

| | | | |
|---|---|---|---|
| 191870 | 12/1937 | Switzerland | 182/6 |

*Primary Examiner*—Reinaldo P. Machado
*Attorney, Agent, or Firm*—Hill, Van Santen, Steadman, Chiara & Simpson

[57] ABSTRACT

Restraining device intends to protect the workman from falling while working at higher environments. The device consists of a fixed cable stretched along the area of interest. A gripping clamp which slides along the cable is attached permanently to the workman's belt. Clamp consists of a pivotal arm which, when a downward load is applied at the point of attachment of the belt, exerts a frictional force on the cable, sufficient to immediately terminate workman's fall.

19 Claims, 6 Drawing Figures

SAFETY CLAMP

Matter enclosed in heavy brackets [ ] appears in the original patent but forms no part of this reissue specification; matter printed in italics indicates the additions made by reissue.

BACKGROUND OF THE INVENTION

1. Field of the Invention

Safety clamp intended to restrain the user from falling without loss of facility or mobility.

2. Prior Art

Safety clamps are well-known to the art. These normally consist of a belt, clamp and a cable, tube or formed metal extended over the area of interest. Current state of the art utilizes a safety clamp separate from the belt. This particular design feature was necessitated because the clamps utilized called for permanent fixture, and as a result, were captive on the cable.

Portable clamps do exist and feature improved mobility. Disassembly, however, is laborious, necessitating the use of both hands, and consequently such clamps are not conducive to such operation at higher elevations.

Current state of the art clamps offer strictly a one-degree of freedom mobility. It is difficult, if not extremely hazardous, to disengage and change cables with the current state of the art clamp while operating in higher environments.

Taller structures require intermediate cable restraints to prevent harmonics in the cable resulting from wind or body movement. Current clamps made for this purpose must be opened and the cable removed to allow the clamp to pass. This necessitates the workman to hold on with one hand while trying to reconstruct this apparatus; an operation which should utilize both hands.

SUMMARY OF THE INVENTION

In order to overcome the problems encountered in prior art safety clamps, the present invention proposed to utilize an integrated clamp-belt unit.

An important advantage of the present invention is in the clamp. The gripping clamp is so designed that the user can remove the clamp from the cable and move to other ladders or work areas. The clamp can be removed from the cable at any point, such as rest stops or immediate work platforms, provided along the ladders.

The removal or transfer of the clamp of this invention does not necessitate the usage of both hands as was required with prior art mechanisms. Such ease of removal and subsequent reengagement of the mechanism on the same or different cable facilitates manipulations at higher elevations.

A further advantage of the invention is that it avoids any necessity to open or disassemble the clamp upon encountering an intermediate cable restraint. The clamp glides over the restraint and avoids the problems inherent in the prior art clamps.

*According to important features of this invention, we have developed a new and improved safety device that includes a safety belt to be worn by a workman. The safety device includes gripping means comprising a clamp having an internally contoured body and a gripping brake arm that is pivotally mounted on the body. One end of the gripping brake arm is fastened to the safety belt. An opposite end of the gripping brake arm has a contoured end positioned inside the internally contoured body and positioned relative to the body for clutching a cable to prevent a workman from falling. Means is provided for attaching the brake arm to the belt in the form of a web. The web is anchored at opposite ends to the belt and passes directly through one end of the gripping brake arm for attaching the same to the belt. A clamp supporting means is also provided on the belt for supporting the clamp in a horizontal carrying position along the periphery of the safety belt while not in use. The one end of the clamp attached to the belt is swingably mounted on the web for movement in a sidewise direction and is alternatively movable into a position for attachment with a cable. When the one end of the cable is swingable into sidewise engagement in face-to-face relation relative to the safety belt, it is held there in place by the clamp supporting means when not in use. Other important features will be apparent from the following detailed description.*

DESCRIPTION OF THE PREFERRED EMBODIMENT

Figure 1:
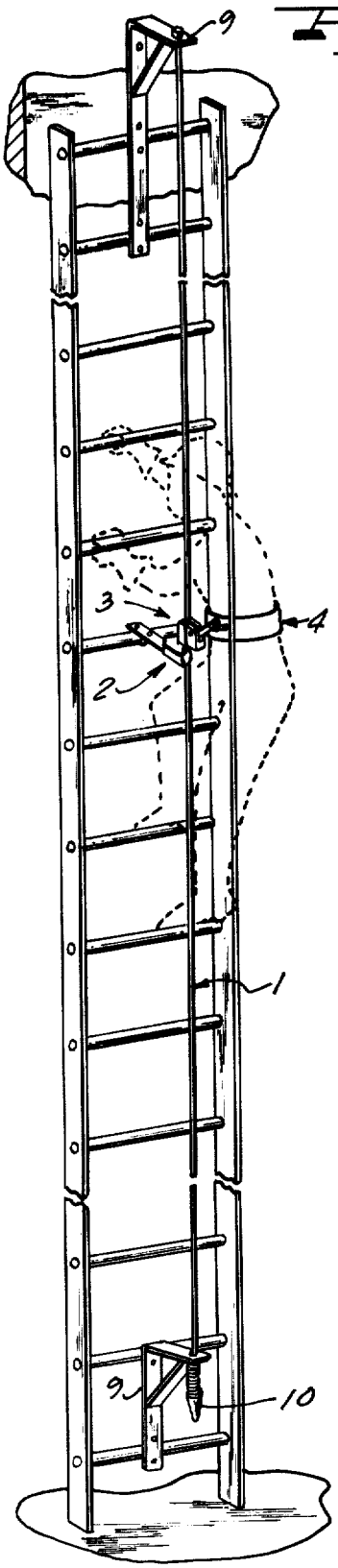
FIG. 1 is a fragmented, functional view of a ladder, equipped with a safety cable and showing the use of a safety belt equipped with a safety clamp embodying features of the invention.

FIG. 1 illustrates a representative embodiment of the invention, and depicts in phantom a workman straddling a restraint cable 1 while wearing a safety belt 4 attached to a gripping clamp 3. The clamp 3 slides along a safety member such as the cable 1 which extends along the entire length of the ladder. Intermediate cable restraints 2 are located at intervals along the cable to prevent harmonic oscillations in the cable resulting from wind or body movements. The cable 1 could be a rod, pipe, wire or track. The geometry of the cable may be round, oval or rectangular, and may be of any suitable material of sufficient strength. The cable is held in place by two cable anchors 9 located at the top and bottom of the ladder. The top cable anchor 9 extends above the top of the ladder, thus facilitating the users disembarkment. The bottom cable anchor 9 has a yieldable tension device 10, spring loaded to allow for minor variations in both the ladder and the cable.

The safety belt 4 comprises a harness 15, (FIG. 2) an anchor web 16 and a bracket 17 attached to the harness 15. The gripping clamp 3 is permanently fastened to the safety belt through an extended gripping arm 5, (FIG. 5) which pivots on a pivot pin 6.

The gripping clamp 3 comprises a body 11 and the gripping arm 5 contained in the internal cavity resulting from the intersection of a longitudinal slot 12 and a vertical slot 13 and a bore 14. The longitudinal slot 12 of width greater than that of the cable is dimensioned to provide clearance for the intermediate cable restraint 2 and facilitates the engagement and disengagement of the clamp.

The gripping arm 5 is an elongate arm, constructed with a suitably, geometrically contoured internal end, preferably arcuately shaped, to allow for minor variations in the cable diameter and passage of the intermediate cable restraint while keeping pressure on the cable constant, containing hole 7 and terminating in a means at the end remote from body 11 and is engaged on the web 16 and thereby anchored to the harness 15 of the safety belt. The gripping arm 5 can be locked in two positions by inserting the constraint pin 8 into hole 7 or hole 7-7A, respectively. When not in use, the gripping arm is locked in a vertical position with the constraint pin 8 to hole 7-7A and the gripping clamp 3 stored along the periphery of the belt in the bracket 17 as illustrated in FIG. 2A.

Figure 3:
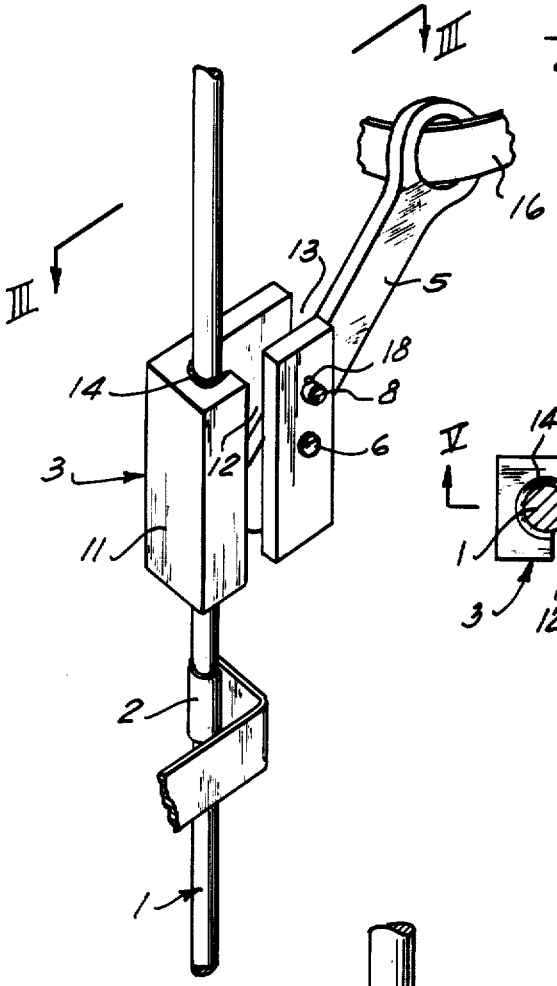
FIG. 3 is an enlarged fragmentary isometric view of the safety clamp, the cable and the intermediate cable restraint.
Figure 4:
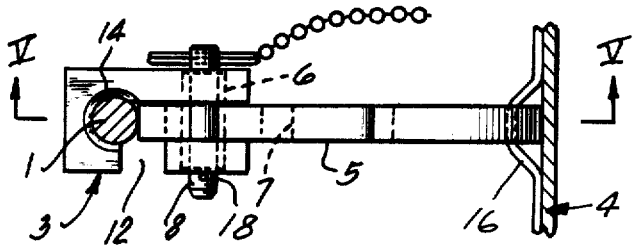
FIG. 4 is a sectional view taken substantially along the line III—III of FIG. 3.
Figure 5:
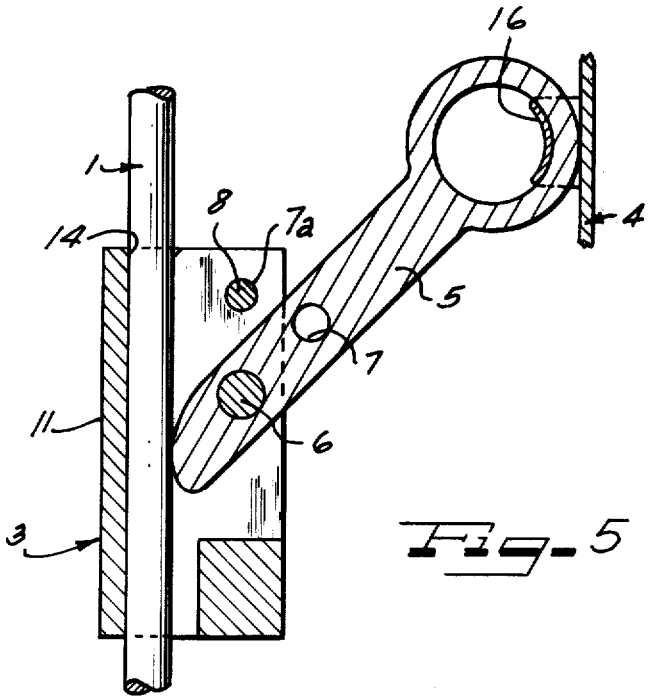
FIG. 5 is a vertical sectional detailed view taken substantially on line V—V in FIG. 4.

While utilized, pulling the constraint pin 8 allows the gripping arm 5 to move to the near vertical position and enables the cable 1 to be received through the longitudinal slot 12 into the bore 14 in the body 11 as shown in FIGS. 3 through 5. The constraint pin 8 is then reinserted in hole 7-7A. The position of the pin is such that it acts as a limiting constraint on the amplitude of a slotted opening resulting from the interaction of the pivotal motion of the gripping arm 5 and the longitudinal slot 12 and thus precludes inadvertent entrance of cable 1 into the longitudinal slot 12 resulting in a release. The constraint pin 8 is fitted with a detent 18 at the leading end. The detent serves as a locking device, constructed to allow for detraction from and subsequent reinsertion of the constraint pin 8 into body 11.

A loop in a gripping arm 5 is attached to the safety belt 4 by sewing it between the harness and the web of the belt. Should the workman lose his footing, the weight of his body applies a downward load on the arm 5 at the point of attachment to the belt. The resultant, angular motion of the gripping arm 5 induces a compressional and a frictional grip on the cable, sufficient to cause an immediate breaking of the workman's fall.

Figure 2:
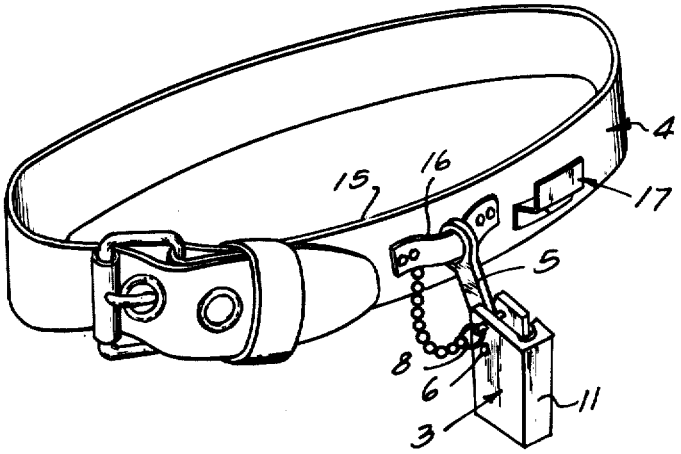
FIG. 2 is a perspective view of the safety belt with the safety clamp in a position for attachment to a cable.
Figure 2A:
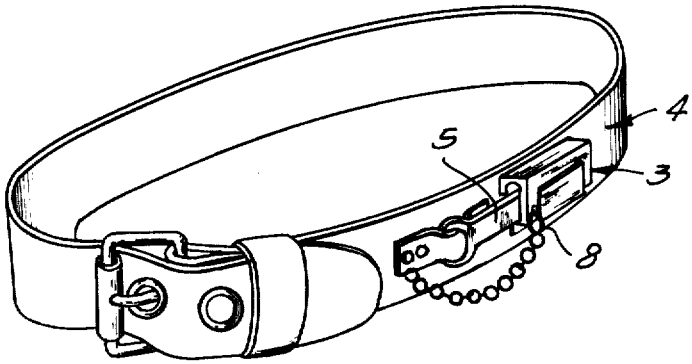
FIG. 2A is a perspective view showing the safety clamp in an at-rest position on the belt.

*From a study of FIGS. 2 and 3, it will be seen that the gripping arm 5 has an upper looped end and that the web 16 passes therethrough to directly attach the gripping arm to the belt 4. It will further be seen where the workman desires to load the safety clamp from a position for attachment to a cable 1, as shown in FIGS. 1 and 2, the workman need only to detach the cable 1 from the clamp 3 and then bodily move the clamp 3 in a sidewise direction so that the clamp is engaged in face-to-face relation with the belt and so that it is there held by the bracket 17.*

What we claim as our invention:

1. A safety device comprising:

a safety belt to be worn by a workman;

gripping means comprising a *gripping* clamp having a body with an internally contoured body and a gripping brake arm pivotally mounted on the body, one end of the gripping brake arm being fastened to said safety belt;

an opposite end of said gripping brake arm having a contoured end positioned inside said internally contoured body for clutching a cable to prevent a workman from falling;

means comprising a web anchored at opposite ends to said belt and passing through said one end of the gripping arm attaching same to said belt; and clamp supporting means comprising an angular open shelf mounted on said safety belt for supporting said clamp in a horizontal carrying position along the periphery of the safety belt while not in use, said clamp being swingably mounted on the web so as to be alternatively movable into a position for attachment with a cable and movable onto engagement with said angular open shelf on the belt when not in use.

2. The safety device of claim 1 further characterized by;

means permanently attaching the web to said belt so that when the web passes through one end of the gripping *brake* arm the web and the gripping *brake* arm are permanently attached to the safety belt.

3. A safety device according to claim 1 comprising:

said clamp supporting means comprising a bracket for supporting said gripping clamp along the periphery of the safety belt while not in use.

4. A safety device according to claim 1 wherein said gripping clamp comprises:

[a] *said* body comprising means defining an internally contoured and externally opened cavity; and

[a] *said* gripping *brake* arm disposed in said cavity and pivotally attached to said body for clutching [a] *the* cable to prevent a workman from falling.

5. A safety device according to claim 1, wherein said gripping clamp comprises:

[a] *said* body having means defining an internally contoured and externally open cavity;

[a] *said* pivot pin located in the body;

a gripping *brake* arm attached to said body by said pivot pin and extending from said body and permanently fastened to the safety belt; and a constraint means to preclude an inadvertant release of the cable.

6. A safety device according to claim 5, wherein said gripping clamp comprises:

[an elongate] *said gripping brake* arm *being elongated* having a geometrically contoured internal end for clutching the cable to prevent a workman from faling extends from said body and is permanently sewn between the harness and the web of said safety belt.

7. A safety device according to claim 5, wherein said constraint means comprises:

a pin fitted with a detent at one end and at the other secured to said safety belt or said gripping clamp, having means to impede the angular motion of the gripping *brake* arm sufficient to preclude an inadvertent release of the cable and while in the at-rest position to keep the gripping *brake* arm locked in the vertical.

8. A safety device including a gripping clamp which comprises:

a body comprising means defining an internally contoured cavity opening externally on a longitudinal face of said body resulting from the intersection of a longitudinal slot extending the length and opening on said face of width and depth sufficient to allow access for a cable into the intersecting bore centered at a head end of said body and another vertical slot opened on top, symmetric about a longitudinal axis of said body, opening normal to an aft end of said body of width and length sufficient to allow a gripping arm a full quadrant of rotation;

pivot means on said body;

a gripping arm having a geometrically contoured internal end for clutching the cable to prevent a workman from falling and to allow for minor variation in the cable diameter while keeping the pressure on the cable constant while rotating on the pivot means located in the aft end of said body, said gripping arm extending from the means defining the internal cavity through the vertical slot opened at the top in the aft end; and a constraint pin comprising means which impedes the angular motion of the gripping arm sufficient to preclude an inadvertent release of the cable.

9. A safety device according to claim 8, wherein said constraint pin further comprises:

means secured to a safety belt or said gripping clamp and fitted with a detent locking said means in said body, but allowing for removal and reinsertion of said means in said body.

10. A safety device according to claim 9, wherein said constraint pin further comprises:

means secured to the safety belt or said gripping clamp and which while the gripping clamp is in the at-rest position keeps said gripping arm locked in the vertical.

11. A safety device including a gripping clamp which comprises a body comprising means defining an internally contoured cavity opening externally on a longitudinal face of said body resulting from the intersection of a longitudinal slot extending the length and opening on said face of width and depth sufficient to allow access for a cable into the intersection bore centered at a head end of said body and another vertical slot opened on top, symmetric about a longitudinal axis of said body, opening normal to an aft end of said body of width and length sufficient to allow a gripping arm a full quadrant of rotation;

pivot means on said body;

a gripping arm having a geometrically contoured internal end for clutching the cable to prevent a workman from faling and to allow for minor variation in the cable diameter while keeping the pressure on the cable constant while rotating on the pivot means located in the aft end of said body, said gripping arm extending from the means defining the internal cavity through the vertical slot opened at the top in the aft end; and means for impeding the angular motion of the gripping arm sufficient to preclude an inadvertent release of the cable.

*12. A safety device according to claim 11, wherein means is provided on the belt for securing the body against the belt along one of the side surfaces of the body in compact relation therewith, said last mentioned means being releasable to allow said body to be swung away from said belt at one end to be positioned for attachment to a cable, said gripping arm being engaged with the belt to secure the body and the gripping arm to the belt at an opposite end of the body.*

*13. A safety device according to claim 12, wherein detent means is provided on said pin for coaction with said body to prevent accidental dislodgment of the pin when engaged with said body to impede angular motion of the gripping arm; means at one end for securement to a safety belt, said pin having a detent locking in said body but allowing for removal and reinsertion of said means in said body.*

*14. A safety device according to claim 13 in combination with a safety belt, means between the belt and the clamp securing one end of said gripping clamp in assembly therewith.*

*15. A safety device comprising: a safety belt to be worn by a workman; gripping means comprising a clamp having an internally contoured body and a gripping brake arm pivotally mounted on the body, one end of the gripping brake arm being fastened to said safety belt; an opposite end of said gripping brake arm having a contoured end positioned inside said internally contoured body and positioned relative to said body for clutching a cable to prevent a workman from falling; means comprising a web anchored at opposite ends to said belt and passing directly through said one end of the gripping brake arm attaching same to said belt; and clamp supporting means on said safety belt for supporting said clamp in a horizontal carrying position along the periphery of the safety belt while not in use, said one end of said clamp being swingably mounted on the web in a sidewise direction and being alternatively movable into a position for attachment with a cable and movable into said sidewise engagement in face-to-face relation relative to said safety belt and so held by said clamp supporting means on the belt when not in use.*

*16. The safety device of claim 15 further characterized by said one end of said brake arm being loop shaped, means permanently attaching the web to said belt so that when the web passes through one looped end of the gripping arm, the web and the gripping arm are permanently attached to the safety belt.*

*17. A safety device according to claim 15 wherein said gripping clamp comprises: said internally contoured body comprising means defining an externally opened cavity; said gripping arm being disposed in said cavity and pivotally attached to said body for clutching a cable to prevent a workman from falling.*

*18. A safety device according to claim 15, wherein said gripping clamp comprises: said internally contoured body having means defining an externally open cavity; a pivot pin located in the cavity in the body; said gripping arm attached to said body by said pivot pin and extending from said body and permanently fastened to the safety belt; and a constraint means to preclude an inadvertent release of the cable.*

*19. A safety device according to claim 18, wherein said gripping clamp comprises: said gripping arm having a geometrically contoured internal end for clutching the cable to prevent a workman from falling and which arm extends from said body at its opposite end which opposite end is permanently sewn between the harness and the web of said safety belt.*

* * * * *